(12) United States Patent
Sorek et al.

(10) Patent No.: US 8,509,518 B2
(45) Date of Patent: Aug. 13, 2013

(54) REAL-TIME IMAGE COLLAGE METHOD AND APPARATUS

(75) Inventors: Noam Sorek, Zikhron-Yaakov (IL); Eduard Oks, Bat-Yam (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1036 days.

(21) Appl. No.: 12/350,270

(22) Filed: Jan. 8, 2009

(65) Prior Publication Data

US 2010/0172586 A1 Jul. 8, 2010

(51) Int. Cl.
*G06K 9/00* (2006.01)

(52) U.S. Cl.
USPC .......................................... 382/154; 382/181

(58) Field of Classification Search
USPC .................................................. 382/154, 181
See application file for complete search history.

(56) References Cited

U.S. PATENT DOCUMENTS 7,440,013 B2 * 10/2008 Funakura ....................... 348/239
7,646,400 B2 * 1/2010 Liow et al. ....................... 348/36

OTHER PUBLICATIONS

U.S. Appl. No. 11/826,767, filed Jul. 18, 2007, Samsung Electronics Co., Ltd.
U.S. Appl. No. 12/071,359, filed Feb. 20, 2008, Samsung Electronics Co., Ltd.

* cited by examiner

*Primary Examiner* — Hadi Akhavannik
(74) *Attorney, Agent, or Firm* — Roach Brown McCarthy & Gruber, P.C.; Kevin D. McCarthy

(57) ABSTRACT

A method for generating combined images from images taken separately with the same or a similar background, comprising the steps of: a) capturing a first image containing one or more selected items; b) capturing a second image containing one or more selected items that were not included in the first image; c) generating a preview image that combines the selected items of the first image and the selected items of the second image, the relative positioning of said selected items being effected using elements in the background; d) combining the images as shown in the preview or as corrected by a user, on receipt of an input from said user; and e) optionally, repeating steps a) through d) with a third image, using the combined image obtained in step d) as one of the two images.

9 Claims, 2 Drawing Sheets

(a)

(b)

(c)

(d)

REAL-TIME IMAGE COLLAGE METHOD AND APPARATUS

FIELD OF THE INVENTION

The present invention relates to the field of image processing. More particularly, the invention relates to a method and apparatus for generating a collage of images in real-time during the capture process thereof.

BACKGROUND OF THE INVENTION

One of the most frustrating problems in photo-taking is group photography. A group of two or more people cannot take pictures that include all the members, without help or without using a tripod. Asking for help may be inconvenient and carrying the tripod is problematic and also requires cumbersome arrangements to ensure that the image taken is exactly what the user wants.

Partial solutions to the problem have been attempted in the art, such as:

(1) Capturing sequences of images and later on post-processing them on a PC. This solution is not convenient because it requires capturing many images and using sophisticated software for post-processing. Therefore, this solution can only be used by advanced users. Furthermore, this solution entails two additional problems:
   i. The user can take the two photos such that the objects are partially or fully overlapping each other, preventing a good stitching during post-processing.
   ii. The automatic stitching programs available on the market are not well-equipped to manage different objects in the stitched images, and therefore obtaining good stitching requires manual operation, which is outside the field of expertise of the average user.
(2) Asking help from another person is not always possible and, in any case, it is a hassle and an inconvenient way to accomplish the desired result;
(3) Using a tripod with the timer mode of the camera requires, of course, that the camera be equipped with a timer, which is not always the case, for instance, with cellular phone cameras. Furthermore, carrying a tripod for the case that a group photography might be desired is not a practical way to operate.

Accordingly, there is a need for a method and apparatus that will solve the above described problem of existing systems.

It is an object of the present invention to provide a method of taking photographs without excluding any of the members of the group and without using a camera timer or a tripod, which overcomes the drawbacks of the prior art.

It is another object of the invention to provide a method for generating a photographic image in real-time, from two images taken separately, which combines persons or items from two different images into a single resulting image.

SUMMARY OF THE INVENTION

The invention relates to a method for generating combined images from images taken separately with the same or a similar background, comprising the steps of:
   a) capturing a first image containing one or more selected items;
   b) capturing a second image containing one or more selected items that were not included in the first image;
   c) generating a preview image that combines the selected items of the first image and the selected items of the second image, the relative positioning of said selected items being effected using elements in the background;
   d) combining the images as shown in the preview or as corrected by a user, on receipt of an input from said user; and
   e) optionally, repeating steps a) through d) with a third image, using the combined image obtained in step d) as one of the two images.

According to an embodiment of the invention the selected items are persons.

The invention further relates to apparatus for generating combined images from images taken separately with the same or a similar background, comprising:
   a) a digital camera;
   b) image processing circuitry including a CPU;
   c) a screen adapted to display digital images; and
   d) image processing software adapted to perform automatic image registration, foreground action and image stitching.

The apparatus can be a separate digital camera or a camera integral with a mobile communication device, e.g., a cellular phone.

The above and other characteristics and advantages of the invention will be better understood through the following illustrative and non-limitative description of an example of operation.

DETAILED DESCRIPTION OF THE INVENTION

Figure 1:
FIG. 1(a through d) shows an example of the capturing process.
Figure 1:
Figure 1:
Figure 1:
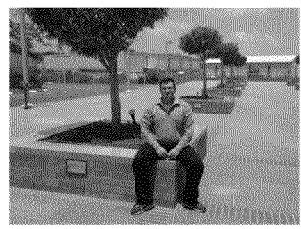

As stated above, the invention allows to capture a group photography including all members without asking for help or carrying a tripod. According to the process of the invention first one group member takes a picture of the group without himself. Later on, another group member, who has already been included in the first photograph, takes a picture of the first photographer, using the guideline preview mode to be illustrated in detail below. At the end of the process a combination between two images is calculated.

In the context of the present invention the term "camera" should be interpreted as relating to any image acquisition apparatus that can generate a digital image. Many of such different types of apparatus exists, such as digital cameras, digital cameras that are built in cellular phones or PDAs, laptop cameras, whether built in or external, digital cameras which are part of video cameras, and essentially any image acquisition apparatus that can perform the activities described in this specification.

One special emphasis is given in this description to the taking of pictures of groups of individuals. Because of the particular difficulties associated with such photographs, it should be understood that the invention is not limited to pictures of persons or, indeed, to any specific type of photographed items. For instance, a user might wish to include a number of items that are physically located apart from one another in a single photograph for the sake of convenience or for any other reason. A simple example would be taking photographs of different statues located in a garden. A user might be interested in keeping images of older statues but might find it convenient to group them together in a single photograph. Then, he would take separate pictures of the statues that cannot be combined in a single frame, and stitched them together in a single photograph. As will be apparent to a skilled person from the above, this also means that the invention is not limited to the combination or "stitching together" of two images only, but a plurality of images can be combined into a single photograph.

An algorithm that performs stitching between two or more images is well-known in the art and is therefore not described herein in detail for the sake of brevity. The invention can employ any suitable image processing methods that is useful to automatically combine images. One such method is disclosed in U.S. patent application Ser. No. 11/826,767 of the same applicant hereof, filed on Jul. 18, 2007, the description of which is incorporated herein by reference. Briefly, according to some embodiments, U.S. Ser. No. 11/826,767 relates to constructing in a transform domain, e.g. a DCT domain, a composite image from a plurality of captured image frames. The plurality of image frames and/or portions of one or more image frames may be stitched and/or juxtaposed to one another to create a composite image including subject matter and/or content from two or more image frames of the plurality of image frames. In some exemplary embodiments, alignment between image frames and/or portions of image frames are user specified. According to some embodiment of U.S. Ser. No. 11/826,767, the composite image is constructed in the transform domain, e.g. in a DCT domain. In an exemplary embodiment, construction is performed by appending image data from two or more image frames block by block. One or more operations may be performed on the appended blocks. In some exemplary embodiments of U.S. Ser. No. 11/826,767, alignment between frames and/or portions of image frames are determined automatically (e.g. without user intervention) based on common features detected in the image frames. According to some embodiments of U.S. Ser. No. 11/826,767, the composite image is a panoramic image. In some exemplary embodiments, the panoramic image is a substantially seamless panoramic image. In other exemplary embodiments, the panoramic image is a mosaic panoramic image.

An aspect of some embodiments of U.S. Ser. No. 11/826,767 relates to defining an alignment in the image domain between a series of image frames and constructing a panoramic image from the series of image frames in a transform domain based on the defined alignment. According to some embodiments of U.S. Ser. No. 11/826,767, the transform domain is a DCT transform domain, e.g. a DCT transform domain typically used in JPEG compression format. According to some embodiments of U.S. Ser. No. 11/826,767, the alignment is defined in real time while capturing the series of image frames to form the panoramic image. According to some embodiments of U.S. Ser. No. 11/826,767, construction and/or stitching of the panoramic image is performed in a post processing procedure based on the defined alignment, e.g. subsequent to saving the series of image frames in a compressed format, e.g. JPEG format. According to some embodiments of U.S. Ser. No. 11/826,767, processing of the image frames in a compressed format is performed in resolution of blocks, e.g. DCT transform blocks.

According to some embodiment of U.S. Ser. No. 11/826,767, interesting features in an image frame near a border to be an overlapping border in the panoramic image is detected in the image domain and the coordinates and/or position of the interesting features are saved and/or recorded. Upon capturing a subsequent image frame, the coordinates of the depicted features is identified in the subsequent image and horizontal as well as vertical shifting between the first and subsequent image, e.g. shifting transformations, is defined. Typically, the image frames included in the panoramic image are full snapshot frames. Optionally the panoramic may include one or more preview images, e.g. lower-resolution image frames.

According to some embodiments of U.S. Ser. No. 11/826,767, a preview image frame corresponding to a captured snapshot image frame is retained in memory in the image domain and used to determine alignment and/or registration between the captured snapshot image frame and a subsequent captured image frame. According to some embodiments of U.S. Ser. No. 11/826,767, the subsequent captured image frame is a snapshot image frame. According to some embodiments of U.S. Ser. No. 11/826,767, alignment between two captured snapshot images is determined based on registration between two corresponding preview image frames corresponding to the two captured snapshot image frames.

According to some embodiments of U.S. Ser. No. 11/826, 767, alignment between two image frames included in a panoramic is image defined based on alignment between a series of captured image frames where only the first and last image frames of the series are included in the panoramic image. The shift, e.g. horizontal and vertical shift, is defined as the sum total of shifting between each of the image frames in the series. In some exemplary embodiments, the image frames between the first and last image frames are preview images.

Suitable algorithms for image registration, image stitching and object tracking are described in U.S. patent application Ser. No. 12/071,359, of the same applicant hereof, filed Feb. 20, 2008, the description of which is incorporated herein by reference. Briefly, an aspect of some embodiments of U.S. Ser. No. 12/071,359 relates to a method for creating an image depicting a motion of a moving object. The method comprises: a) identifying a motion of a moving object in a plurality of initial images depicting a scene, b) using the motion for capturing a plurality of reference images of the moving object, c) cropping at least one sub-image depicting at least the moving object from at least one of the plurality of reference images, and d) combining the at least one sub-image and at least one of the plurality of reference images to produce a final representation depicting the motion.

Optionally, the resolution of the plurality of initial images is lower than the resolution of the plurality of reference images. Optionally, the method further comprises identifying the moving object in a plurality of non-overlapping areas in the plurality of initial images before b), the capturing being performed according to the plurality of non-overlapping areas. Optionally, the method further comprises identifying the moving object in a first and a second of the plurality of initial images before b), the capturing being performed according to the first and second initial images, wherein the first and second initial images depicting the moving object in first and second positions, the first and second positions being located in a predefined range from one another.

Optionally, each initial image is a joint photographic experts group (JPEG) image, wherein the identifying comprises identifying the motion by comparing discrete cosine transform (DCT) coefficients of former and later of the plurality of initial images. Optionally, the capturing comprises: capturing a first reference image and identifying boundaries encircling the moving object therein before b), wherein each reference image depicts the moving object outside of the boundaries. Optionally, the method further comprises assembling at least two of the plurality of reference images to create a panoramic image before the combining, the combining comprises combining the at least one sub-image and the panoramic image to produce the final representation.

The image registration and stitching requires complex mathematical calculations. This can be achieved, for instance, using modern mobile phone devices that have the following capabilities:

For the implementation of Registration: 2.4M instructions per frame;

For the implementation of Foreground detection: 1.5M instructions per frame;

For the implementation of Image stitching: 2.8M instruction per frame;

In this example, therefore, 6.7M instructions per frame are needed.

By instructions per frame it is meant to indicate the number of operations carried out by the CPU per frame.

If it is desired to perform all the above operations during a camera preview mode, with a frame rate of at least 15 frames/second, that means that only 67 millisecond per frame are needed. The CPU that operates the camera should work at least at a frequency of 100 MHz only for performing the above algorithm calculations. There is an additional overhead of the whole device management that requires additional CPU power. Modern mobile phone CPUs function at frequencies of at least 200 MHz, which is strong enough to perform the above-mentioned calculations. When slower CPUs are used, then simpler algorithm calculations are required and that may reduce the quality of the algorithm result.

The present invention uses known algorithms for registration, image stitching and foreground detection, on powerful mobile phone device to generate automatic solution. These methods are disclosed in U.S. patent application Ser. No. 11/826,767 of the same applicant hereof, filed on Jul. 18, 2007, which is incorporated herein by reference.

The above is illustrated with reference to the figures, which show a simple example of the operation of the invention. The first two steps of the process take place in FIG. 1. FIG. 1(a) shows the first photographer taking a picture of a second person. This picture is seen in FIG. 1(b). Then the two individuals switch places, and the one whose picture has already been taken in FIG. 1(b) now becomes the photographer in FIG. 1(c), and the photographer of FIG. 1(a) now has his picture taken in FIG. 1(d).

Figure 2:
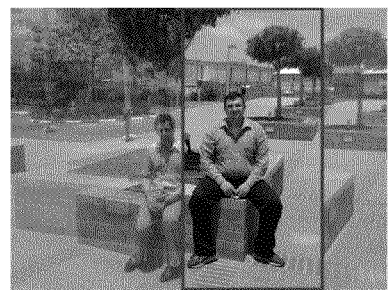
FIG. 2 shows the guideline preview for the stitching of the images taken in FIG. 1, according to one embodiment of the invention.
Figure 3:
FIG. 3 shows the final result of the process.

FIG. 2 illustrates how the two images are stitched together in real-time by either one of the users, using the so-called "Guideline Preview Mode". In practice, the two images are automatically superimposed using a best fit algorithm of the type described above. Optionally, commands are provided to the user (not shown) that allow him to manipulate the images in the preview mode to obtain a fit better to his liking. This, after the user confirms that the image seen in the preview mode is acceptable, is seen in FIG. 3.

As will be apparent to the skilled person, the invention provides a very effective and easy to operate solution to the problem of prior art methods. Of course, the description given above has been provided for the purpose of illustration and is not intended to limit the invention in any way. Many modifications can be effected in the method of the invention, and many different apparatus can be provided which incorporate the invention, all without exceeding its scope.

The invention claimed is:

1. A method for generating combined images from images taken separately with the same or a similar background, comprising the steps of:
    a) capturing, by means of a digital camera, a first image containing one or more selected items;
    b) capturing, by means of said digital camera, a second image containing one or more selected items that were not included in said first image while referring to position indicators of said same or similar background which were generated during a preview mode, the relative positioning of said one or more selected items of said second image being effected using said position indicators;
    c) identifying a best fit boundary between said first and second images;
    d) locally and automatically processing said first and second captured images by superimposing said second image on top of said first image along said best fit boundary and modifying some image data in the vicinity of said best fit boundary block by block, to generate a preview image that combines the selected items of said first image and the selected items of said second image; and
    e) producing a final image as shown in said preview image or as corrected by a user on receipt of an input from said user;
    wherein steps (a) through (e) are repeated with a third image;
    wherein first and second best fit boundaries are simultaneously generated between the first and second images and between the second and third images, respectively, or between the first and second images and between the first and third images, respectively, and then said second and third images are superimposed on top of the first image along said first and second best fit boundaries while some image data is modified in the vicinity of said first and second best fit boundaries block by block.

2. The method according to claim 1, wherein one of the selected items is a person.

3. A digital camera for generating combined images from images taken separately with the same or a similar background, comprising:
    a) image processing circuitry including a central processing unit (CPU);
    b) a screen adapted to display digital images; and
    c) image processing software for locally and automatically performing image registration, foreground action and image stitching,
    wherein said CPU is operable in conjunction with said image processing software in a preview mode to generate:
        i) position indicators of said same or similar background for facilitating capturing of a second image containing one or more selected items that were not included in selected items of a first image also captured by said camera;
        ii) a best fit boundary between said first and second images; and
        iii) a preview image that combines the selected items of said first image and the selected items of said second image by superimposing said second image on top of said first image along said best fit boundary and modifying some image data in the vicinity of said best fit boundary block by block,
    wherein said CPU is also operable to generate a final image as shown in said preview image or as corrected in response to user manipulation;
    wherein steps (a) through (c) and (i) through (iii) are repeated with a third image;
    wherein first and second best fit boundaries are simultaneously generated between the first and second images and between the second and third images, respectively, or between the first and second images and between the first and third images, respectively, and then said second and third images are superimposed on top of the first image along said first and second best fit boundaries while some image data is modified in the vicinity of said first and second best fit boundaries block by block.

4. The digital camera according to claim 3, which also comprises a mobile communication device.

5. The digital camera according to claim 4, wherein the mobile communication device is a cellular phone.

6. The method according to claim 1, wherein using the combined image obtained in step (e) as one of the first or second images.

7. The method according to claim 1, wherein one or both of the first and second images is a moving image.

8. The method according to claim 1, wherein one or more of the first, second and third images is a moving image.

9. The method according to claim 2, wherein a first person whose image was captured subsequently captures an image of a second person and then produces the final image that combines the selected items of the first image of the first person and the selected items of the second image of the second person.

* * * * *